United States Patent
Luo et al.

(10) Patent No.: US 7,505,097 B2
(45) Date of Patent: Mar. 17, 2009

(54) MANUFACTURING METHOD OF REFLECTIVE LAYER OF DISPLAY DEVICE, REFLECTIVE LCD DEVICE AND TRANSFLECTIVE LCD DEVICE

(75) Inventors: Hung-Yi Luo, Sanchong (TW);
Min-Chin Su, Kaohsiung (TW);
Shih-Han Chen, Taipei (TW);
Been-Chih Liou, Hsinchu (TW);
Jr-Hong Chen, Jhudong Township (TW)

(73) Assignee: TPO Displays Corp., Chu-Nan (TW)

( * ) Notice: Subject to any disclaimer, the term of this patent is extended or adjusted under 35 U.S.C. 154(b) by 302 days.

(21) Appl. No.: 11/104,784

(22) Filed: Apr. 12, 2005

(65) Prior Publication Data

US 2006/0227265 A1    Oct. 12, 2006

(51) Int. Cl.
*G02F 1/1335* (2006.01)
(52) U.S. Cl. ...................................... 349/113
(58) Field of Classification Search ........................ None
See application file for complete search history.

(56) References Cited

U.S. PATENT DOCUMENTS 6,674,496 B2    1/2004  Wei

2004/0027510 A1*  2/2004  Iijima et al. .................... 349/61
2004/0041967 A1*  3/2004  Maeda et al. ................ 349/113

FOREIGN PATENT DOCUMENTS

JP    2001091942    4/2001

OTHER PUBLICATIONS

Attached machine translated document of Ozawa Kinya et al (JP 2004-004494).*

* cited by examiner

*Primary Examiner*—David Nelms
*Assistant Examiner*—Lucy P Chien
(74) *Attorney, Agent, or Firm*—Liu & Liu (57) ABSTRACT

A reflective and a transflective liquid crystal display device and a manufacturing method thereof are provided. The manufacturing method includes the following steps. First, a substrate structure of a reflective or a transflective liquid crystal display device is provided. Next, a reflection layer is formed over the substrate structure, a protection layer is formed over the reflection layer, and a photoresist layer is formed over the protection layer. Then, the photoresist layer is patterned to form a patterned photoresist layer, the protection layer is patterned to form a patterned protection layer, and the reflection layer is patterned to form a patterned reflection layer. Thereafter, the patterned photoresist layer is removed.

20 Claims, 7 Drawing Sheets

MANUFACTURING METHOD OF REFLECTIVE LAYER OF DISPLAY DEVICE, REFLECTIVE LCD DEVICE AND TRANSFLECTIVE LCD DEVICE

BACKGROUND OF THE INVENTION

1. Field of the Invention

The present invention generally relates to a manufacturing method of a reflection layer of a display device. More particularly, the present invention relates to a manufacturing method of a reflection layer of a display device, a reflective liquid crystal display device and a transflective liquid crystal display device.

2. Description of Related Art

In general, conventional LCD may be classified into transmissive LCD, reflective LCD, and transflective LCD according to the type of light source of the LCD. For the reflective LCD, a reflection layer is disposed behind the liquid crystal panel for reflecting the light from the environment or the light from the light module. For the transflective LCD, a back light module is disposed behind the liquid crystal panel, and the light in the environment of the LCD is allowed to pass through the liquid crystal panel. In addition, a layer including reflection region and transparent region is disposed between the liquid crystal panel and the back light module.

Therefore, the power consumption of the reflective LCD and transflective LCD may be reduced drastically. Especially, the portable electronic product is often used outdoors. In general, when the environment is brightly lit, the contrast ratio of the transmissive LCD is reduced since the brightness of background is high. However, for the reflective LCD or the transflective LCD, since the light in the environment is used as the light source, the contrast ratio of the reflective LCD or the transflective LCD is not influenced.

In the manufacturing process of the conventional reflective LCD or transflective LCD, a problem occurs when the reflection layer is manufactured. In general, a non-patterned reflection layer is formed, and a photoresist layer is formed on the non-patterned reflection layer and then is patterned. As the photoresist layer is developed, a chemical reaction or electrochemical reaction may be generated between the developer solution and the reflection layer or the film layers beneath the reflection layer. Accordingly, a lot of defects such as peelings or through holes are generated in the reflection layer, thus the pixels of the LCD may be damaged by the defects or some bright spots may be generated. Therefore, it is necessary to improve the manufacturing process of the reflective LCD or transflective LCD to enhance the yield.

SUMMARY OF THE INVENTION

The present invention relates to a manufacturing method of a reflection layer of a display device, wherein the defects such as the peelings or through holes in the reflection layer and the failure of pixels such as bright spot may be avoided by forming a protection layer, which function as to avoid the problem caused by the reactions between the developer and the reflection layer, over the reflection layer. The reflection layer may be prevented from damaged due to the etching process of protection layer. Thus, the yield of the display of the present invention can be enhanced.

In addition, the present invention relates to a reflective liquid crystal display device and a transflective liquid crystal display device, wherein the defects such as the peelings or through holes in the reflection layer and the failure of pixels such as bright spot may be avoided by forming a protection layer over the reflection layer. The protection layer is preferably transparent, and therefore the protection may be not necessary to be removed without affecting the performance. Thus, the yield of the display of the present invention can be enhanced.

According to one embodiment of the present invention, the manufacturing method of the reflection layer of a reflective or a transflective liquid crystal display device comprising the following steps. First, a substrate structure of a reflective or a transflective liquid crystal display device is provided. Next, a reflection layer, a protection layer and a photoresist layer are formed over the substrate structure. Then, the photoresist layer, the protection layer, and the reflection layer are patterned. Thereafter, the patterned photoresist layer is removed.

According to one embodiment of the present invention, the reflective liquid crystal display device includes a first substrate including a first transparent electrode, a second substrate, a liquid crystal layer between the first transparent electrode and the second substrate, a light source module, a polarizer, a reflection layer and a protection layer. The reflection layer may be disposed over a surface of the second substrate adjacent to the liquid crystal layer, wherein the reflection layer comprises a reflection area. The protection layer may be disposed over a surface of the reflection layer adjacent to the liquid crystal layer.

According to one embodiment of the present invention, the transflective liquid crystal display device includes a first substrate including a first transparent electrode, a second substrate including a second transparent electrode, a liquid crystal layer between the first and the second transparent electrode, a light source module, a first polarizer, a second polarizer, a reflection layer and a protection layer. The reflection layer may be disposed over a surface of the second transparent electrode adjacent to the liquid crystal layer, wherein the reflection layer comprises a reflection area and a transparent area. The protection layer may be disposed over a surface of the reflection layer adjacent to the liquid crystal layer.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
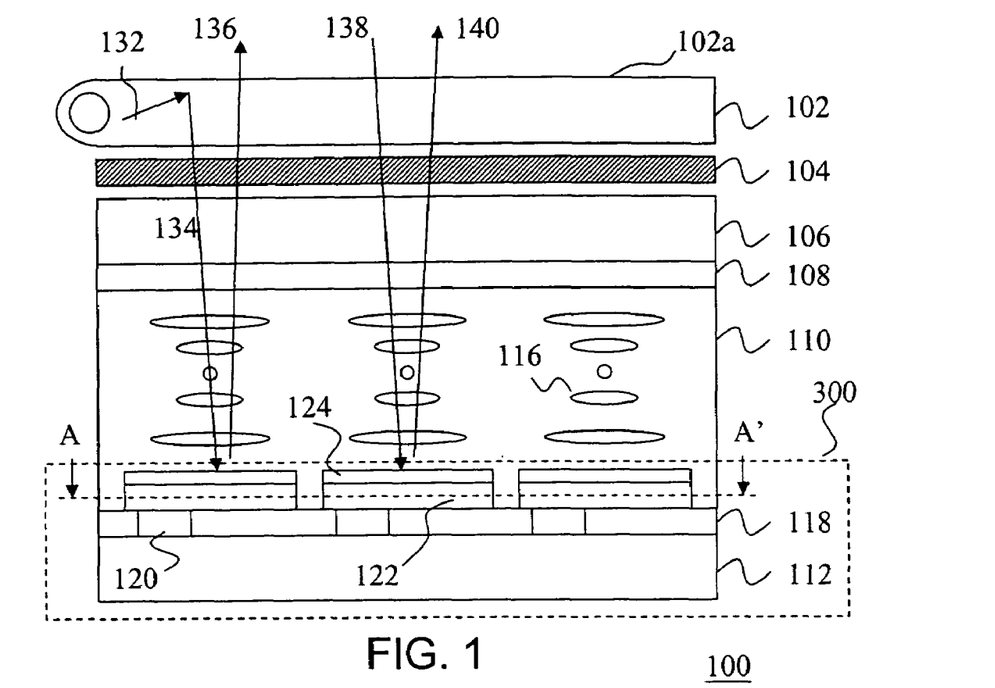
FIG. 1 is a schematic sectional view illustrating a reflective LCD according to one embodiment of the present invention.

FIG. 1 is a schematic cross-sectional view illustrating a reflective LCD according to one embodiment of the present invention. Referring to FIG. 1, a reflective LCD 100 comprises, for example but not limited to, a light source module 102, a polarizer 104, a first substrate 106, a first transparent electrode 108, a liquid crystal layer 110 comprising a plurality of liquid crystal molecules 116, a second substrate 112, a reflection layer 122 and a protection layer 124 formed over the reflection layer 122. It is noted that the reflection layer 122 may be provided as an electrode to operate with the first transparent. electrode 108 to change the polarization direction of the liquid crystal molecules 116.

Referring to FIG. 1, a light 132 emitted from the light source module 102 does not pass through the light source module 102 to the external environment directly, but may be reflected by the surface 102a to form the light 134. The light 134 is reflected by the reflection layer 122, and thus a light 136 is formed. In addition, a light 138 from the environment above the surface 102a of the light source module 102 is also reflected by the reflection layer 122, and thus a light 140 is formed. If the light 136 or 140 may pass through the polarizer 104, the light 136 or 140 may be observed by the viewer. Therefore, any one or both of the light from the environment or the light from the light source module 102 may be provided as the light source of the reflective LCD 100.

Referring to FIG. 1, the polarizer 104 is adopted for polarizing the light 134 or 138, thus the light 134 or 138 has a specific polarization direction after it passes through the polarizer 104. Thereafter, if polarization direction of the light 134 (or light 138) or the reflected light 136 (or light 140) of the light 134 (or light 138) is not changed by the liquid crystal molecule 116, the light 136 (or light 140) may pass through the polarizer 104 and the light source module 102 to the viewer, otherwise only a portion or even none of the light 136 (or light 140) can be observed by the viewer. Specially, when the polarization direction of the light 136 (or light 140) is perpendicular to that of the polarizer 104, the light 136 (or light 140) can not pass through the polarizer 104, therefore can not be observed by the viewer.

In one embodiment of the present invention, the first substrate 106 may comprise, for example, a transparent substrate such as glass substrate. The second substrate 112 may comprise, for example, transparent or non-transparent substrate such as glass substrate or silicon substrate. The first transparent electrode 108 is formed over the first substrate 106 and the reflection layer 122 is formed over the second substrate 112. The material of the first transparent electrode 108 may comprise indium tin oxide (ITO) or indium zinc oxide (IZO). The liquid crystal layer 110 comprising liquid crystal molecules 116 is filled between the first transparent electrode 108 and the protection layer 124.

In one embodiment of the present invention, the reflection layer 122 is formed over a surface of the second substrate 112, and the material thereof may comprise metal or alloy. The protection layer 124 is formed over the reflection layer, and the material thereof may comprise organic material, conductive inorganic material or non-conductive inorganic material. The organic material comprises, for example, resin or organic polymer, and may be formed by, for example, coating method. The conductive inorganic material comprises, for example, indium tin oxide (ITO) or indium zinc oxide (IZO), and may be formed by, for example, physical vapor deposition (PVD) method. The non-conductive inorganic material may comprise, for example, all transparent non-conductive inorganic material, and may be formed by, for example, PVD method or chemical vapor deposition (CVD) method.

In another embodiment of the present invention, the protection layer 124 may be formed by applying an anodization process to the surface of the reflection layer 122 directly, and thus the anodization layer on the surface of the reflection layer 122 is used as the protection layer 124.

In one embodiment of the present invention, a semiconductor component layer 118 may be further composed between the reflection layer 122 and the second substrate 112. The semiconductor component layer 118 may comprises, for example, thin film transistors (TFT) 120 for driving reflective LCD 100.

Figure 2:
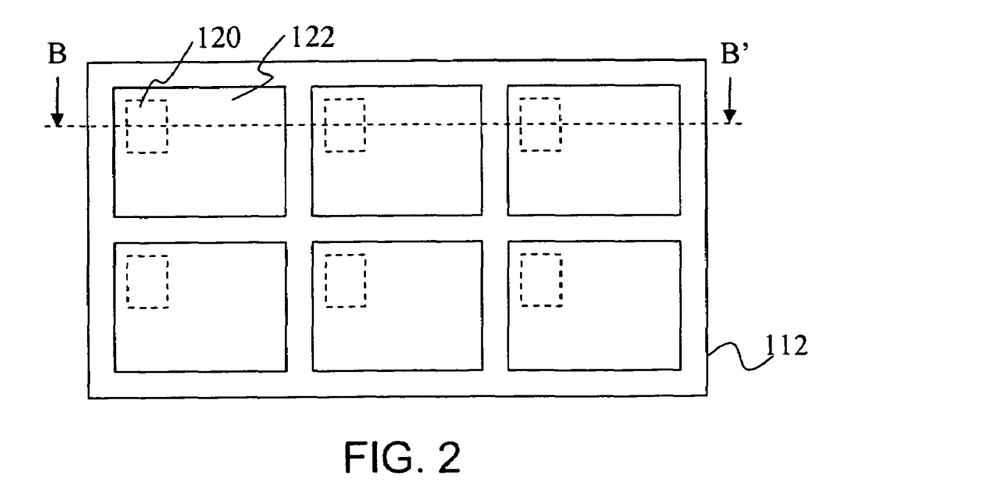
FIG. 2 is a schematic sectional view along line A-A' of the reflective LCD shown in FIG. 1.

FIG. 2 is a schematic sectional view along line A-A' of the reflective LCD 100 shown in FIG. 1. Referring to FIG. 2, the reflection layer 122 is formed over a surface of the semiconductor component layer 118, wherein each pixel is covered by a region of the reflection layer 122. In one embodiment of the present invention, the pixel may comprise a monochromatic pixel or a sub-pixel having any one the three primary colors (red, green or blue). The block 120 shown with dotted line in FIG. 2 represents a thin film transistor (TFT) 120 for driving the pixel corresponding to the reflection layer 122 comprising the thin film transistor (TFT) 120. It is noted that, the sectional view of the reflective LCD 100 shown in FIG. 1 is a sectional view along the line B-B' shown in FIG. 2.

Figure 3A:
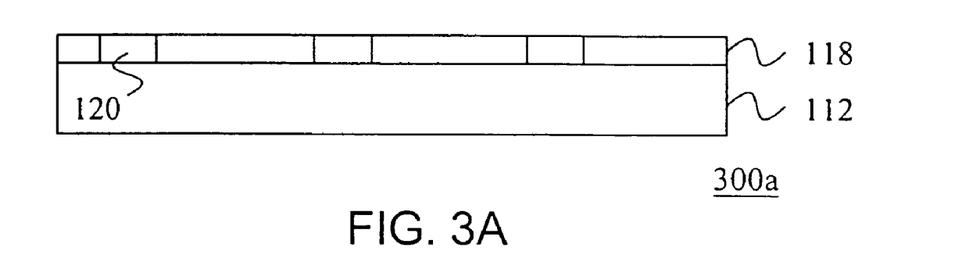
FIGS. 3A to 3F are schematic sectional views illustrating a manufacturing process of reflection layer and protection layer according to one embodiment of the present invention.

FIGS. 3A to 3F are schematic sectional views illustrating a manufacturing process of reflection layer and protection layer according to one embodiment of the present invention. Referring to FIG. 3A, a substrate structure 300a is formed by the following steps. First, a second substrate 112 comprising, for example, transparent or non-transparent substrate such as glass substrate or silicon substrate is provided. In another embodiment of the present invention, a semiconductor component layer 118 comprising, for example, thin film transistors 120 may be formed over the second substrate 112.

Figure 3B:
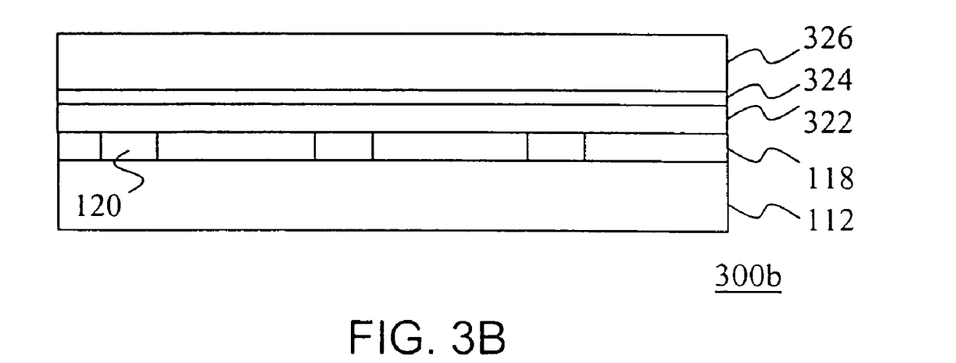

Next, referring to FIG. 3B, a reflection layer 322, a protection layer 324, and a photoresist layer 326 may be formed over the substrate structure 300a. Therefore, the substrate structure 300b is formed.

In one embodiment of the present invention, the material of the reflection layer 322 may comprises metal or alloy. The material of the protection layer 324 may comprise organic material, conductive inorganic material or non-conductive inorganic material. The organic material comprises, for example, resin or organic polymer, and may be formed by, for example, coating method. The conductive inorganic material comprises, for example, indium tin oxide (ITO) or indium zinc oxide (IZO), and may be formed by, for example, physical vapor deposition (PVD) method. The non-conductive inorganic material may comprise, for example, all transparent non-conductive inorganic material, and may be formed by, for example, PVD method or chemical vapor deposition (CVD) method.

In another embodiment of the present invention, the anodization process may be applied to the surface of the reflection layer 322 directly, and thus the anodization layer on the surface of the reflection layer 322 is used as the protection layer 324.

Figure 3C:
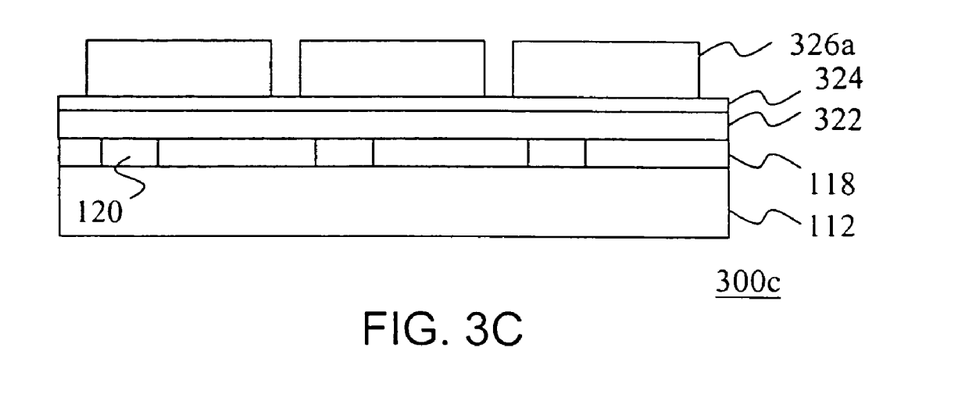

Thereafter, referring to FIG. 3C, the photoresist layer 326 over the substrate structure 300b is patterned (e.g., including the steps of masking and etching) to form a patterned photoresist layer 326a. Thereafter, the substrate structure 300c is obtained.

Figure 3D:
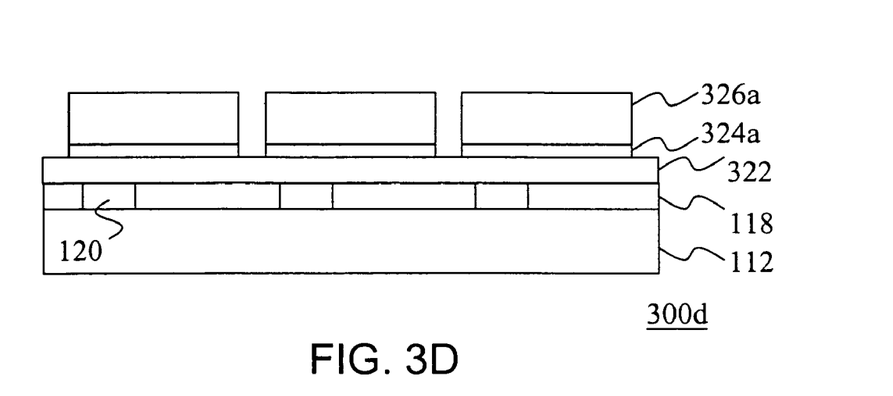

Next, referring to FIG. 3D, the protection layer 324 over the substrate structure 300c is etched using the patterned photoresist layer 326a as a mask, to form the patterned protection layer 324a. Then, the substrate structure 300d is obtained.

Figure 3E:
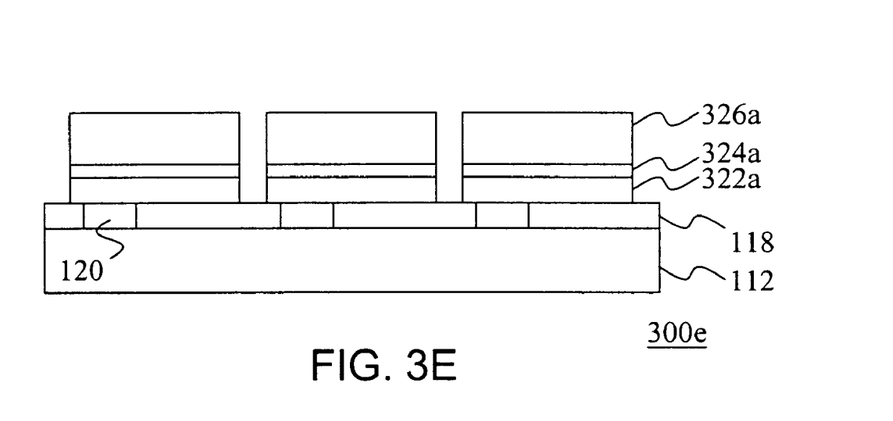

Then, referring to FIG. 3E, the reflection layer 322 over the substrate structure 300d is etched using the patterned photoresist layer 326a and patterned protection layer 324a as a mask, to form a patterned reflection layer 322a. Thereafter, the substrate structure 300e is obtained.

Figure 3F:
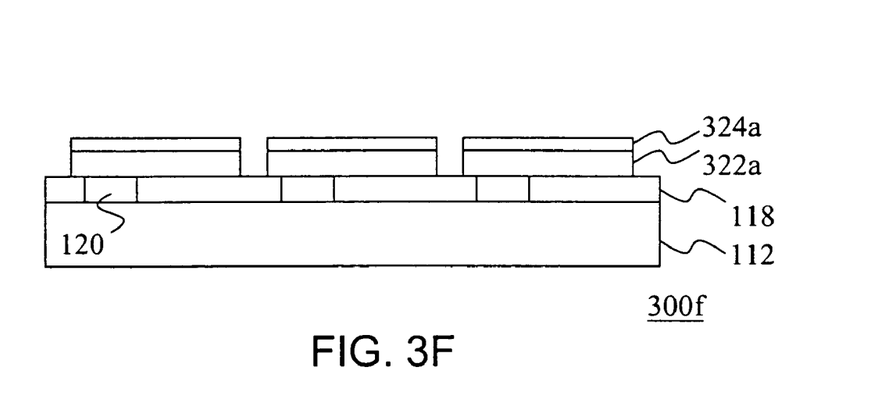

Thereafter, referring to FIG. 3F, the patterned photoresist layer 326a over the substrate structure 300e is removed, and thus the substrate structure 300f is obtained. In one embodiment of the present invention, the substrate structure 300f may be provided as the substrate 300 as shown in FIG. 1. Accordingly, the schematic top view of the substrate structure 300f may be, for example but not limited to, the diagram shown in FIG. 2, wherein the profile of the reflection layer 322a and the patterned protection layer 324a may be the reflection layer 122 and the protection layer 124 shown in FIG. 1 respectively.

The range of the thickness of the reflection layer 122 is not limited. In one embodiment of the present invention, the thickness of the protection layer 124 may be in a range of about 10 nm to about 1 μm, and preferably under 1000 nm.

Accordingly, in the present invention, since a protection layer 324 is formed between the photoresist layer 326 and the reflection layer 322, thus when the photoresist layer 326 is developed, the problem caused by the reactions between the developer and the surface of reflection layer 322 (and the film layers under the reflection layer 322, e.g., the second substrate 112 or the semiconductor component layer 118) may be avoided. Therefore, the defects such as the peelings or through holes in the reflection layer can be avoided, and the failure of pixels such as bright spot may be eliminated. Thus, the yield of the display of the present invention can be enhanced.

Figure 4:
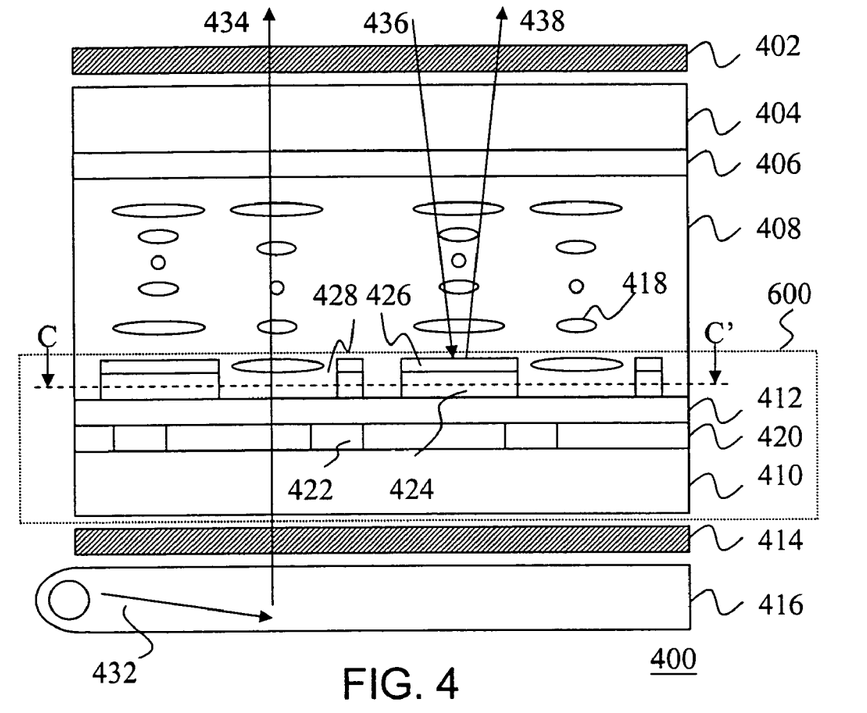
FIG. 4 is a schematic sectional view illustrating a transflective LCD according to one embodiment of the present invention.

FIG. 4 is a schematic sectional view illustrating a transflective LCD according to one embodiment of the present invention. Referring to FIG. 4, the transflective LCD 400 comprises, for example but not limited to, a first polarizer 402, a first substrate 404, a first transparent electrode 406, a liquid crystal layer 408, a second substrate 410, a second transparent electrode 412, a second polarizer 414, a light source module 416, and a transflective layer comprising, for example, a reflection layer 424, a protection layer 426 over the reflection layer 424, and a transparent region 428.

Referring to FIG. 4, the light 432 emitted from the light source module 416 may be totally reflected to form a light 434. A portion of the light 434 may pass through the transparent region 428, and the polarization direction of the light 434 may be changed by the liquid crystal layer 408. In addition, a light 436 from the environment above the polarizer 402 may pass through the liquid crystal layer 408 and be reflected by the reflection layer 424 to form a light 438. Thereafter, if the polarized light 434 or 438 may pass through the first polarizer 402, the polarized light 434 or 438 may be observed by the viewer. Therefore, any one or both of the light from the environment or the light from the light source module 416 may be provided as the light source of the transflective LCD 400.

Referring to FIG. 4, the first substrate 404 and the second substrate 410 may comprise transparent substrate comprising, for example, glass substrate. The first transparent electrode 406 is formed over the first substrate 404 and the second transparent electrode 412 is formed over the second substrate 410. The material of the transparent electrode may comprise, indium tin oxide (ITO) or indium zinc oxide (IZO). The liquid crystal layer 408 comprising liquid crystal molecules 418 is filled between the first transparent electrode 406 and the second transparent electrode 412.

The reflection layer 424 is formed over a surface of the second transparent electrode 412a, and a material thereof may comprise metal or alloy. The protection layer 426 is formed over the reflection layer 424, and a material thereof may comprise organic material, conductive inorganic material or non-conductive inorganic material. The material and manufacturing method of the protection layer 426 is similar to that of the protection layer 124 and are not repeated again.

In another embodiment of the present invention, the protection layer 426 may be formed by applying an anodization process to the surface of the reflection layer 424 directly, and thus the anodization layer on the surface of the reflection layer 424 is used as the protection layer 426.

In one embodiment of the present invention, a semiconductor component layer 420 may be further composed between the second transparent electrode 412 and the second substrate 410. The semiconductor component layer 420 may comprise, for example, thin film transistors (TFT) 422 for driving reflective LCD 400.

Figure 5:
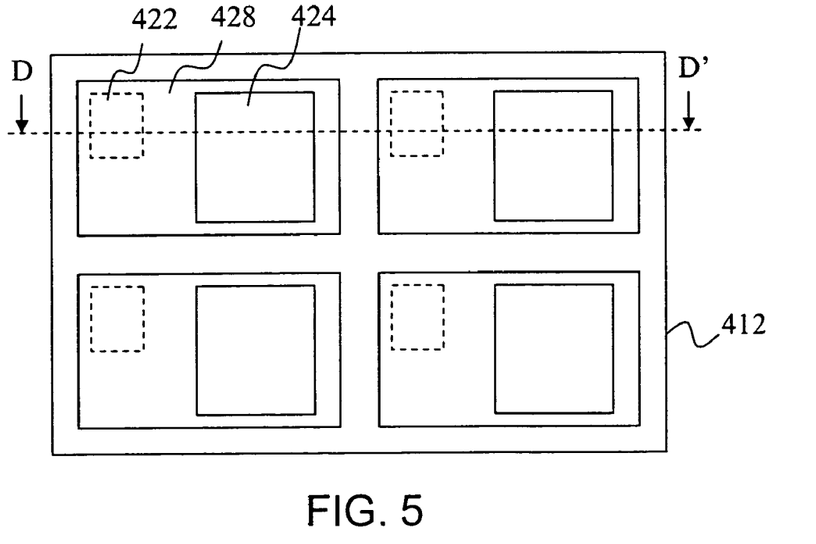
FIG. 5 is a schematic sectional view along line A-A' of the transflective LCD shown in FIG. 4.

FIG. 5 is a schematic sectional view along line C-C' of the transflective LCD 400 shown in FIG. 4. Referring to FIG. 5, the reflection layer 424 and the transparent region 428 are formed over a surface of the second transparent electrode 412, wherein each pixel is covered by a boundary of the reflection layer 424. As shown in FIG. 4, the transparent region 428 is adopted for allowing the passing through of the light 434 from the light source module 416, and the reflection layer 424 is provided for reflecting the light 436 from the environment. In one embodiment of the present invention, the pixel may comprise a monochromatic pixel or a sub-pixel having any one the three primary colors (red, green or blue). The block 422 shown with dotted line in FIG. 5 represents a thin film transistor (TFT) 422 for driving the pixel corresponding to the reflection layer 424 comprising the thin film transistor (TFT) 422. It is noted that, the sectional view of the transflective LCD 400 shown in FIG. 4 is a sectional view along the line D-D' shown in FIG. 5.

Figure 6A:
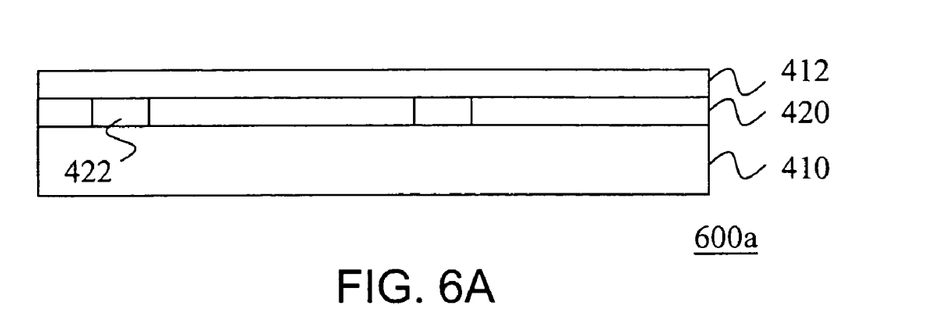
FIGS. 6A to 6F are schematic sectional views illustrating a manufacturing process of reflection layer, protection layer and penetrate area according to one embodiment of the present invention.

FIGS. 6A to 6F are schematic sectional views illustrating a manufacturing process of reflection layer, protection layer and penetrate area according to one embodiment of the present invention. Referring to FIG. 6A, a substrate structure 600a is formed by the following steps. First, a second substrate 410 comprising, for example, transparent substrate such as glass substrate is provided. Then, a second transparent electrode 412 is formed over the second substrate 410. The material of the second transparent electrode 412 may comprise, for example, indium tin oxide (ITO) or indium zinc oxide (IZO). In another embodiment of the present invention, a semiconductor component layer 420 comprising, for example, thin film transistors 422 may be formed over the second substrate 410, and then the second transparent electrode 412 may be formed over the semiconductor component layer 410.

Figure 6B:
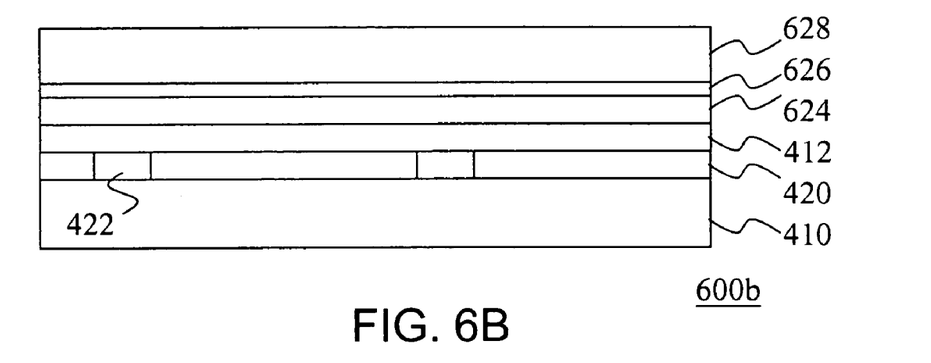

Next, referring to FIG. 6B, a reflection layer 624, a protection layer 626, and a photoresist layer 628 may be formed over the substrate structure 600a. Therefore, the substrate structure 600b is formed. The material and the manufacturing method of the reflection layer 624, a protection layer 626, and a photoresist layer 628 are similar to that of the reflection layer 322, a protection layer 324, and a photoresist layer 326 and thus will mo more be described.

In another embodiment of the present invention, the anodization process may be applied to the surface of the reflection layer 624 directly, and thus the anodization layer on the surface of the reflection layer 624 is used as the protection layer 626.

Figure 6C:
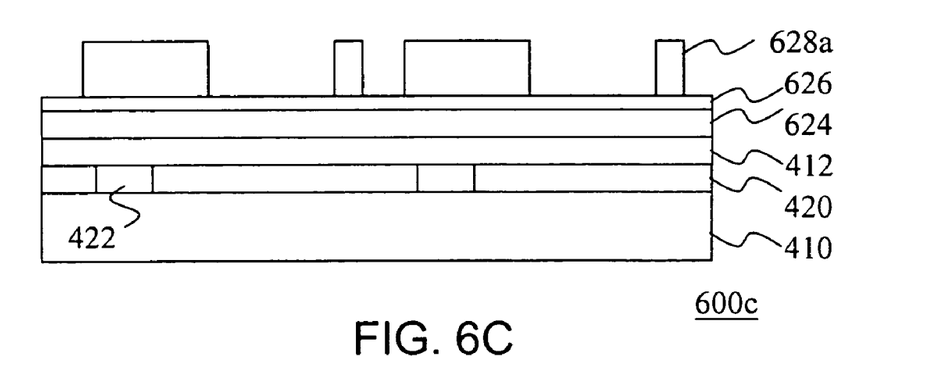

Thereafter, referring to FIG. 6C, the photoresist layer 628 over the substrate structure 600b is patterned (e.g., including the steps of masking and etching) to form a patterned photoresist layer 628a. Thereafter, the substrate structure 600c is obtained.

Figure 6D:
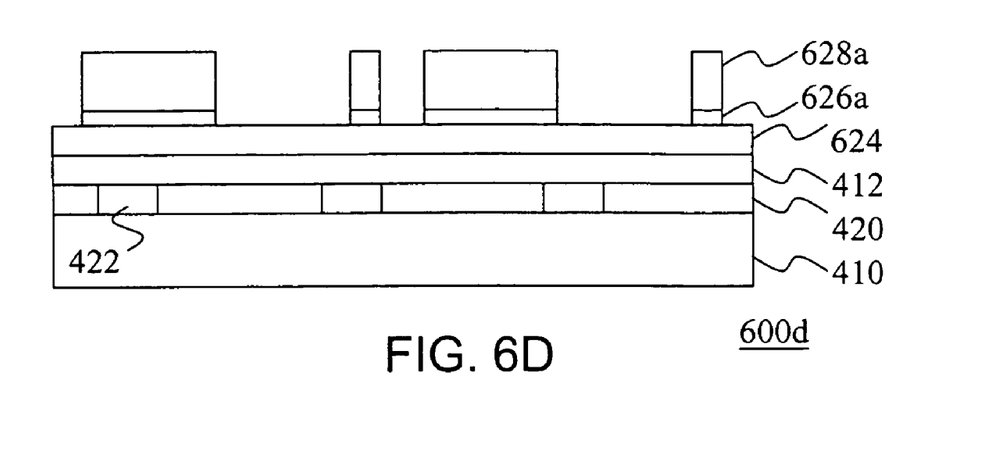

Next, referring to FIG. 6D, the protection layer 626 over the substrate structure 600c is etched using the patterned photoresist layer 628a as a mask, to form the patterned protection layer 626a. Then, the substrate structure 600d is obtained.

Figure 6E:
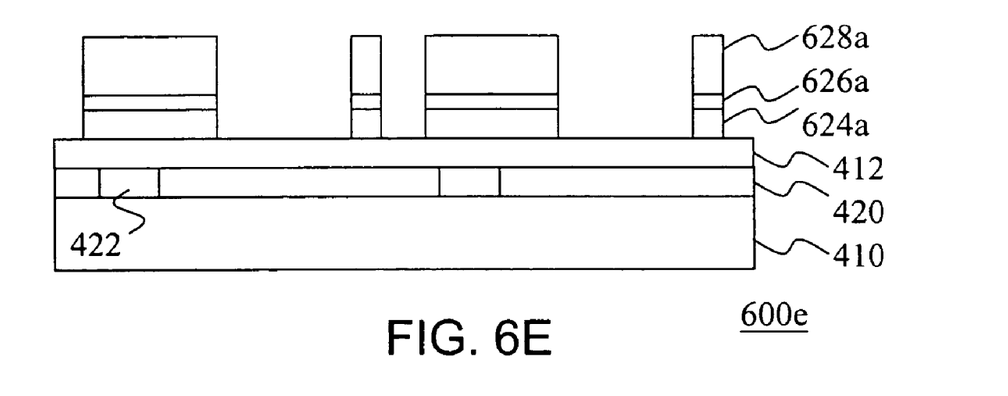

Then, referring to FIG. 6E, the reflection layer 624 over the substrate structure 600d is etched using the patterned photoresist layer 628a and patterned protection layer 626a as a mask to form a patterned reflection layer 624a. Thereafter, the substrate structure 600e is obtained.

Figure 6F:
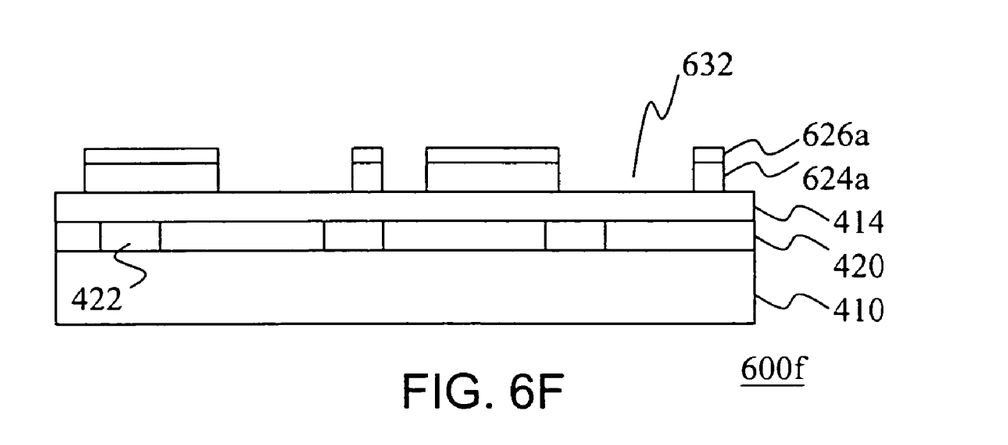

Thereafter, referring to FIG. 6F, the patterned photoresist layer 628a over the substrate structure 600e is removed, and thus the substrate structure 600f is obtained. In one embodiment of the present invention, the substrate structure 600f may be provided as the substrate 600 as shown in FIG. 4. Accordingly, the schematic top view of the substrate structure 600f may be, for example but not limited to, the diagram shown in FIG. 5, wherein the profile of the reflection layer 624a, the patterned protection layer 626a and the transparent region 632 may be the reflection layer 424, the protection layer 426 and the transparent region 428 shown in FIG. 4 respectively.

The range of the thickness of the reflection layer 324 is not limited. In one embodiment of the present invention, the thickness of the protection layer 326 may be in a range of about 10 nm to about 1 μm, and preferably under 1000 nm.

Accordingly, in the present invention, since a novel protection layer 626 which function as to avoid the problem caused by the reactions between the developer and the reflection layer 624 (and the film layers under the reflection layer 624, e.g., the second transparent electrode 412), is formed between the photoresist layer 628 and the reflection layer 624, thus when the photoresist layer 628 is developed, the defects such as the peelings or through holes in the reflection layer can be avoided, and the failure of pixels such as bright spot may be eliminated. Thus, the yield of the display of the present invention can be enhanced.

Figure 7:
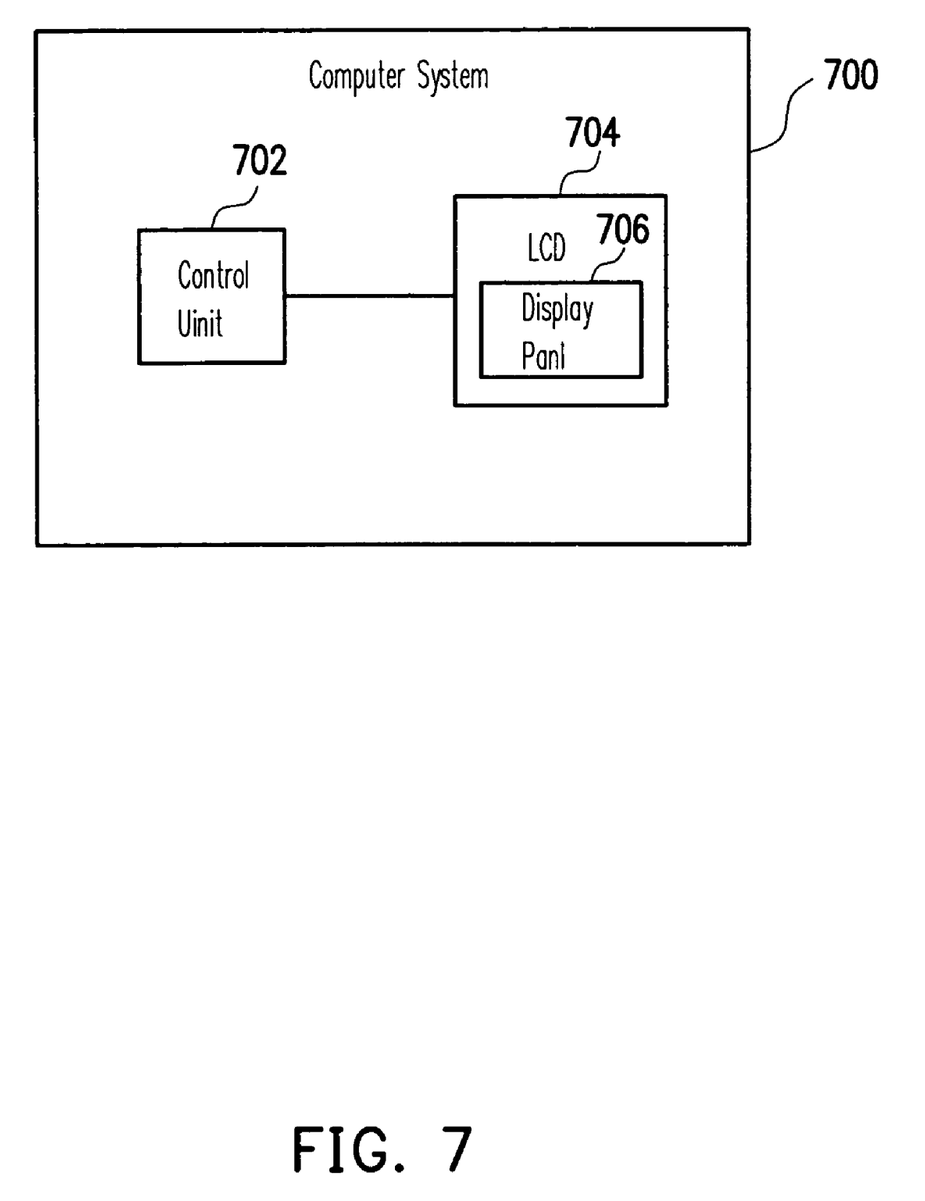
FIG. 7 is a block diagram, schematically illustrating an electronic device, according to one embodiment of the present invention.

In FIG. 7, an electronic device, such as a computer system, is shown. The electronic device 700 can be, for example, a computer system, a TV system, a monitoring system, a mobile phone, . . . , and so on. The computer system is taken as an example. The computer system 700 includes a control unit 702 and the LCD unit 704. The control unit 702 controls an operation of the electronic device. The LCD unit 704 includes the display panel 706, which has the structure and is formed by the foregoing descriptions, according to the present invention. In other words, the display panel of the present invention can be incorporated into an electronic device with the LCD device for at least displaying any information.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of forming a reflection layer structure in a liquid crystal display device, comprising the steps of:
   providing a substrate structure;
   supporting a reflection layer on the substrate structure;
   providing a protection layer on the reflection layer, wherein the protection layer is formed by performing an anodization method to a surface of the reflection layer;
   patterning the protection layer to form a patterned protection layer;
   patterning the reflection layer using the patterned protection layer as a mask, to form a patterned reflection layer.

2. The method as in claim 1 wherein the step of patterning the protection layer comprises the steps of providing a photoresist layer on the protection layer and patterning the photoresist layer to form a patterned photoresist layer as a mask for patterning the protection layer.

3. A method of manufacturing a liquid crystal device, comprising the steps of:
   forming a reflective layer structure as in claim 1;
   providing a liquid crystal layer above the reflective layer;
   providing a transparent electrode structure with the liquid crystal layer between the transparent electrode structure and the reflective layer structure, wherein the patterned reflection layer does not support any electrode between the liquid crystal layer and the patterned reflection layer.

4. The manufacturing method of claim 1, wherein a material of the reflection layer comprises a metal or an alloy.

5. The manufacturing method of claim 1, wherein a material of the protection layer comprises an organic material, a conductive inorganic material or a non-conductive inorganic material.

6. The manufacturing method of claim 5, wherein when the material of the protection layer comprises the organic material, the material comprises a resin or an organic polymer.

7. The manufacturing method of claim 5, wherein when the material of the protection layer comprises the conductive inorganic material, the material comprises indium tin oxide (ITO) or indium zinc oxide (IZO).

8. The manufacturing method of claim 1, wherein when the reflection layer is adopted for a reflective liquid crystal display device, the patterned reflection layer comprises a reflection area.

9. The manufacturing method of claim 1, wherein when the reflection layer is adopted for a transflective liquid crystal display device, the patterned reflection layer comprises a reflection area and a transparent area.

10. A liquid crystal display panel, comprising:
    a substrate structure;
    a patterned reflection layer on the substrate structure;
    a patterned protection layer on the patterned reflection layer, wherein the protection layer is formed by performing an anodization method to a surface of the reflection layer;
    wherein the patterned reflection layer has been patterned using the patterned protection layer as a mask;
    a transparent electrode substrate structure; and a liquid crystal layer disposed between the substrate structure and the transparent electrode structure.

11. The liquid crystal display panel as in claim 10, further comprising a light source disposed on a side of the transparent electrode substrate structure away from the liquid crystal layer, wherein the patterned reflection layer does not support any electrode between the liquid crystal layer and the patterned reflection layer.

12. A liquid crystal display device, comprising the liquid crystal display panel as in claim 10.

13. The liquid crystal device as in claim 12, further comprising a light source disposed on a side of the substrate structure away from the liquid crystal.

14. The liquid crystal device as in claim 12, wherein the liquid crystal device comprises a reflective liquid crystal device.

15. The liquid crystal display device of claim 14, wherein a material of the protection layer comprises an organic material, a conductive inorganic material or a non-conductive inorganic material.

16. The liquid crystal device as in claim 12, wherein the liquid crystal device comprises a transflective liquid crystal device.

17. The liquid crystal display device of claim 16, wherein a material of the protection layer comprises an organic material, a conductive inorganic material or a non-conductive inorganic material.

18. An electronic device, comprising:
at least one of the reflective liquid crystal display device as in claim 15 and the transflective liquid crystal display device as in claim 16; and
a control unit for controlling an operation of the electronic device.

19. The electronic device of claim 18, wherein a material of the protection layer comprises an organic material, a conductive inorganic material or a non-conductive inorganic material.

20. The method as in claim 1, wherein the step of patterning the protection layer is performed after forming the protection layer, and the step of patterning the reflection layer is performed after forming the patterned protection layer.

* * * * *